(12) United States Patent
Kulprathipanja et al.

(10) Patent No.: US 8,470,081 B2
(45) Date of Patent: Jun. 25, 2013

(54) PROCESS FOR SEPARATING PARTICULATE SOLIDS FROM A GAS STREAM

(75) Inventors: Sathit Kulprathipanja, Schaumburg, IL (US); Paolo Palmas, Des Plaines, IL (US); Richard A. Johnson, II, Algonquin, IL (US)

(73) Assignee: UOP LLC, Des Plaines, IL (US)

( * ) Notice: Subject to any disclaimer, the term of this patent is extended or adjusted under 35 U.S.C. 154(b) by 232 days.

(21) Appl. No.: 13/018,510

(22) Filed: Feb. 1, 2011

(65) Prior Publication Data

US 2012/0192714 A1 Aug. 2, 2012

(51) Int. Cl.
*B01D 45/12* (2006.01)

(52) U.S. Cl.
USPC ........ 95/269; 95/271; 95/78; 95/268; 55/338; 55/340; 55/459.1; 55/347; 55/345; 55/343; 55/318; 55/452; 55/348; 55/349; 55/DIG. 30; 96/15

(58) Field of Classification Search
USPC ................ 55/338, 340, 459.1, 347, 345, 343, 55/318, 452, 348, 349, DIG. 30; 95/269, 95/78, 271, 268; 96/15; 208/113
See application file for complete search history.

(56) References Cited

U.S. PATENT DOCUMENTS

| | | | |
|---|---|---|---|
| 3,948,757 A | 4/1976 | Strother | |
| 4,292,050 A | 9/1981 | Linhardt et al. | |
| 4,718,923 A | 1/1988 | Haag et al. | |
| 4,865,629 A * | 9/1989 | Zievers et al. | 95/268 |
| 5,180,486 A * | 1/1993 | Smolensky et al. | 210/195.1 |
| 5,413,699 A | 5/1995 | Chou | |
| 5,681,450 A | 10/1997 | Chitnis et al. | |
| 5,690,709 A | 11/1997 | Barnes | |
| 5,779,746 A | 7/1998 | Buchanan et al. | |
| 6,355,178 B1 | 3/2002 | Couture et al. | |
| 6,595,147 B2 | 7/2003 | Teller et al. | |
| 6,733,554 B2 | 5/2004 | Ribera Salcedo | |
| 6,902,593 B2 | 6/2005 | Miller et al. | |
| 7,048,782 B1 | 5/2006 | Couch et al. | |
| 7,572,364 B2 | 8/2009 | Evans et al. | |
| 7,816,575 B2 | 10/2010 | Beech, Jr. et al. | |
| 7,857,889 B2 * | 12/2010 | Morf | 95/13 |
| 2002/0068031 A1 * | 6/2002 | Confuorto et al. | 423/239.1 |
| 2002/0178703 A1 | 12/2002 | Ribera Salcedo | |

(Continued)

FOREIGN PATENT DOCUMENTS

| | | |
|---|---|---|
| WO | 9723581 | 7/1997 |
| WO | WO2008147233 A2 | 12/2008 |

OTHER PUBLICATIONS

"Hurricane & ReCyclone Systems Particulate Matter Emission Control & Air Dedusting", Brochure by Advanced Cyclone Systems, No Later than May 2010, p. 12 Pages.

(Continued)

*Primary Examiner* — Jason M Greene
*Assistant Examiner* — Dung H Bui
(74) *Attorney, Agent, or Firm* — James C Paschall

(57) ABSTRACT

One exemplary embodiment can be a process for separating particulate solids from a gas stream. The process can include regenerating a catalyst in a regenerator, separating particulate solids in first and second cyclone stages, passing the gas stream from the second cyclone stage to an external third stage separator, and passing the gas stream from the external third stage separator to a cyclone recirculator to obtain a clean gas stream.

16 Claims, 2 Drawing Sheets

U.S. PATENT DOCUMENTS

| | | | | |
|---|---|---|---|---|
| 2006/0130445 | A1* | 6/2006 | Park et al. | 55/346 |
| 2006/0144231 | A1* | 7/2006 | Borley | 95/271 |
| 2007/0197845 | A1 | 8/2007 | Beech et al. | |
| 2010/0218467 | A1* | 9/2010 | Witter | 55/337 |
| 2011/0013662 | A1* | 1/2011 | Missalla et al. | 373/60 |
| 2012/0067214 | A1* | 3/2012 | Ribera Salcedo | 95/69 |
| 2012/0138861 | A1* | 6/2012 | Liu | 252/373 |

OTHER PUBLICATIONS

"Hurricane & ReCyclone Systems Food, Chemical and Pharmaceutical Powder Recovery", Brochure by Advanced Cyclone Systems, No Later than May 2010, p. 12 Pages.

Hypes et al., "Methods for Control and Recovery of Particulate Matter (PM) Generated in the FCC Process", 2000 NPRA Annual Meeting Papers, 2000, vol. 2000, pp. 19.

Niccum et al., "FCC Flue Gas Emission Control Options", 2002 NPRA Annual Meeting Papers, 2002, vol. 2002, pp. 1-18.

Standard Oil Company of California, "Upgrading Electrostatic Precipitators", Environmental Science Technology, Apr. 1977, vol. 11, No. 4, p. 333.

Weaver et al., "Particulate Control Options for FCCU Regenerator Flue Gas—Performance, Economics, Flexibility, and Reliability", 1998 NPRA Environmental Conference Papers, Nov. 1998, vol. 1998, pp. 1-13.

* cited by examiner

PROCESS FOR SEPARATING PARTICULATE SOLIDS FROM A GAS STREAM

FIELD OF THE INVENTION

This invention generally relates to a process for separating particulate solids from a gas stream.

DESCRIPTION OF THE RELATED ART

Industry standards have been reducing the amount of particulates emitted to the environment. Often, emitted gas streams such as flue gases contain particulates. The standards are requiring lower amounts of particulates in released streams to enhance environmental quality.

Often, a cyclonic system is used to reduce particle emissions. In a cyclonic system, the particulates collection efficiency can be a function of the particle velocity and particle size distribution (hereinafter may be abbreviated as "PSD"). The greater the average particle size of the solids in a flue gas stream, the better the collection efficiency of the cyclonic system. Generally, a flue gas stream can contain solids in the range of about 30-about 40 microns with an average particle size of less than about 10 microns. Generally, smaller particles can be more difficult to capture by using existing technologies, such as an external third stage separator that is often used with one or more cyclonic stages. Hence, these systems may not meet new environmental standards and regulations requiring less particle emissions. As a consequence, there is a desire to improve these systems to provide a gas effluent that has low levels of particles, particularly those particles that are smaller and more difficult to separate from the gases.

SUMMARY OF THE INVENTION

One exemplary embodiment can be a process for separating particulate solids from a gas stream. The process can include regenerating a catalyst in a regenerator, separating particulate solids in first and second cyclone stages, passing the gas stream from the second cyclone stage to an external third stage separator, and passing the gas stream from the external third stage separator to a cyclone recirculator to obtain a clean gas stream.

Another exemplary embodiment may be a process for separating particulate solids from a gas stream. The process can include regenerating a catalyst in a regenerator, separating particulate solids in a first and/or second cyclone stage, and passing the gas stream from the first and/or second cyclone stage to an external stage separator. The external stage separator can include a vessel, in turn, including an inlet for receiving the gas stream, and a first outlet for providing a clean gas stream and a second outlet for providing collected particulate solids. Typically, the vessel contains an electrical field positioned between the inlet and at least one cyclone.

A further exemplary embodiment can be a process for separating particulate solids from a gas stream. The process can include regenerating a catalyst in a regenerator, separating particulate solids in a first and/or second cyclone stage, passing the gas stream from the first and/or second cyclone stage to an external stage separator, and passing the gas stream from the external stage separator to a cyclone recirculator. The cyclone recirculator can originate a current density below about 0.1 mA/m$^2$ to obtain a clean gas stream and a further gas stream including particulate solids. The further gas stream can be sent to the external stage separator.

The embodiments provided herein can remove smaller particles that may be difficult to separate in conventional third stage separation systems. Particularly, the embodiments herein can utilize a device that electrostatically charges the particles while using centrifugal force to separate the particles into a collection point. Particularly, the device can clump the particles and separate them in a single vessel to enhance collection efficiency and reduce the costs of the system. Generally, such a device is particularly useful for removing particles of less than about 10 microns in size. In one exemplary embodiment, a cyclone recirculator using a combination of electrostatic charges and centrifugal force can agglomerate and collect particles in a gas stream. The collected particles can then be provided to an external third stage separator. In such an instance, a clean flue gas can be obtained from the cyclone recirculator and sent to a waste gas recovery system, such as a heat exchanger, to recover the heat energy, and exhaust to a stack. In another exemplary embodiment, a third-stage separator can have multiple small electrical wires across the vessel to generate electrostatic charges to agglomerate particles. As the charged particles flow downward, the particles can agglomerate into larger particle clusters and then be collected and removed.

DEFINITIONS

As used herein, the term "stream" can include various hydrocarbon molecules, and/or other substances, such as gases, e.g., hydrogen, carbon dioxide, carbon monoxide, and oxygen, or impurities, such as heavy metals, and sulfur and nitrogen compounds. Moreover a stream can include one or more phases, such as a dispersion. One exemplary stream can include both gas and solids, such as an aerosol.

As used herein, the term "milligrams per normal meter cubed" can be abbreviated "mg/Nm$^3$".

As depicted, process flow lines in the figures can be referred to interchangeably as, e.g., lines, pipes, feeds, products, effluents, portions, parts, or streams.

As used herein, the terms, e.g., "particles", "particulates", and "particulate solids" may be used interchangeably.

DETAILED DESCRIPTION

Figure 1:
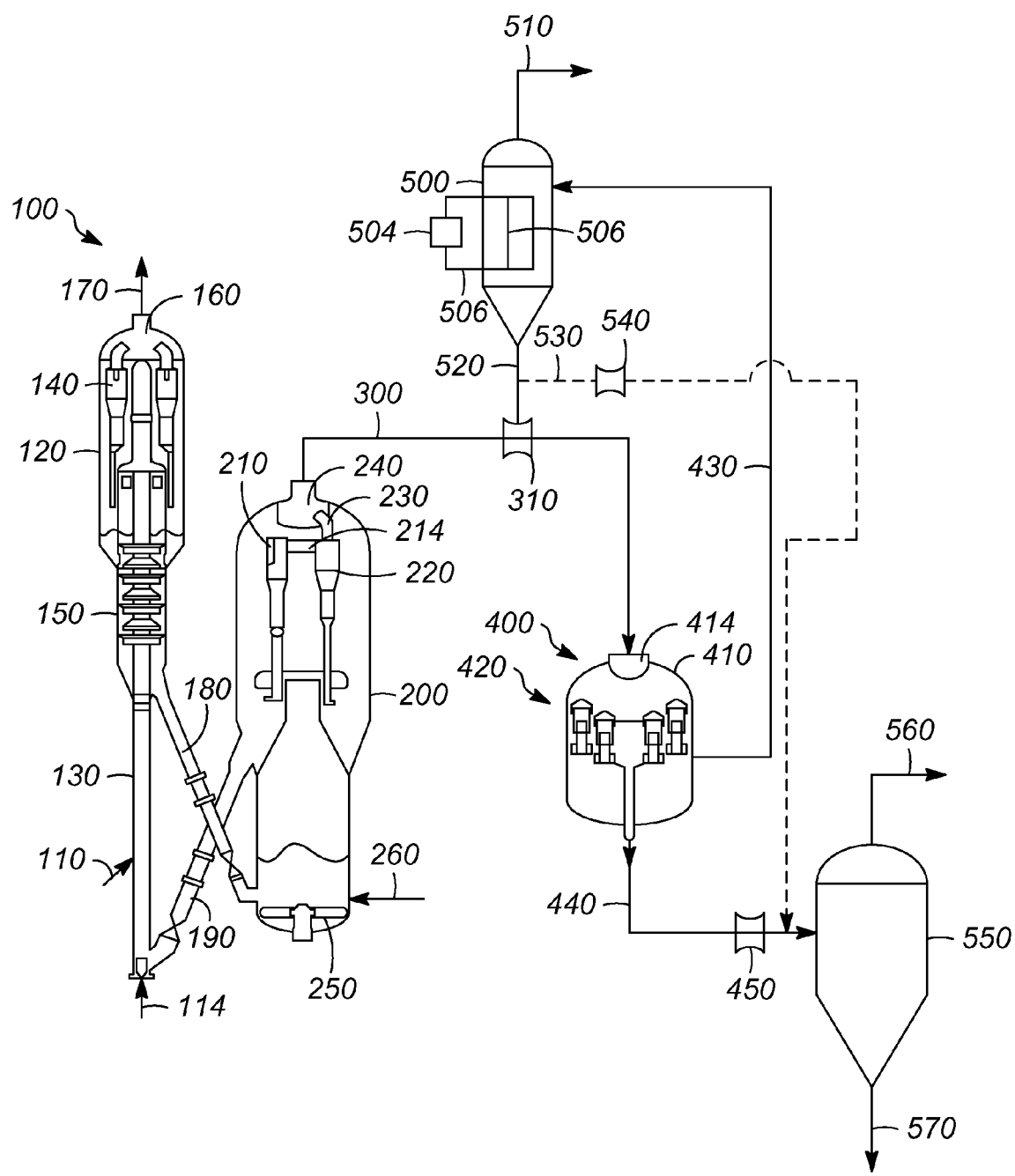
FIG. 1 is a schematic depiction of an exemplary fluid catalytic cracking unit with an external third stage separator and a cyclone recirculator.

A fluid catalytic cracking (hereinafter may be referred to as "FCC") unit 100 can include a reaction vessel 120, a regenerator 200, an external third stage separator 400, a cyclone recirculator 500, and a filter 550. Typically, the reaction vessel 120, the regenerator 200, and the external third stage separator 400 can be any suitable vessel, such as those disclosed in, e.g., U.S. Pat. No. 7,048,782 B1.

In this exemplary embodiment, the reactor vessel 120 can include a riser 130, a reactor cyclone 140, and a stripping zone 150. Generally, the reactor vessel 120 contains an internal plenum 160. In addition, a spent catalyst standpipe 180 connected to the regenerator 200 to provide spent catalyst, and a regenerated catalyst standpipe 190 transfer the regenerated catalyst from the regenerator 200 to the base of the riser 130.

The regenerator 200 can include a first cyclone stage 210, a second cyclone stage 220, an outlet 230, and an air distributor 250. Generally, the regenerator 200 contains an internal plenum 240. Although the first cyclone stage 210 and the second cyclone stage 220 are depicted, any suitable number of stages may be utilized. Generally, the first cyclone stage 210 and the second cyclone stage 220 are housed within the regenerator 200. The first cyclone stage 210 and the second cyclone stage 220 are utilized to separate combustion gases from entrained catalyst. Although the first cyclone stage 210 is often used in series with the second cyclone stage 220, only one cyclone stage 210 or 220 may be used.

The external third stage separator 400 can include a vessel 410 housing one or more cyclones 420, and may be referred to as an external stage separator 400 if only one stage 210 or 220 proceeds it. Generally, gases enter the external third stage separator 400 and using centrifugal force, most of the particulate solids pass out the bottom of the vessel 410 while gases can be removed from the side of the vessel 410. Generally, two streams issue from the vessel 410 with the bottom stream having larger sized particulates entrained therein and the stream exiting the side of the vessel 410 having smaller particles entrained therein.

The cyclone recirculator 500 can include a straight-through cyclone, such as a concentrator, electrified by a high voltage direct current power supply. Generally, the cyclone recirculator 500 has a direct current power supply 504 and a series of wires 506 where at least some or a portion of the wires 506 can be positioned in parallel and running at least a part of a length or a height of the cyclone recirculator 500 to generate an electric field. An exemplary cyclone recirculator 500 is disclosed in, e.g., WO 2008/147233 A2. The voltage can be applied to the discharge electrode, where the diameter of the discharge electrode and its distance from the concentrator wall can be combined to originate a current density below about 0.1 mA/m$^2$ to create the electrical field. Properties of the cyclone recirculator 500 are provided in the table below:

TABLE 1

| Interelectrode Spacing (mm) | Average Electrical Field (volt/meter) | Current Density (mA/m$^2$) | Migration Velocity for Particle Diameters Between 0.1-10 μm (m/s) |
|---|---|---|---|
| 450-600 | <20,000 | <0.1 | 0.01-0.05 |

The cyclone recirculator 500 may be orientated substantially horizontally or vertically. In this exemplary embodiment, the orientation is substantially vertical. Particle capture in the cyclone recirculator 500 can be minimized or, preferably, none at all. The electrostatic circulation clears particles from an exhaust channel located at a vertical axis of the cyclone recirculator 500 making the particles approach the recirculator walls without collection on the walls. Hence, the particles can agglomerate upon exit and be returned to the external third stage separator 400. Thus, the recirculation efficiency can be enhanced by implementing a direct current electrical field in the cyclone recirculator 500 to agglomerate particles as long as the discharge and collection are designed to prevent the cyclone recirculator 500 from operating as an electrostatic precipitator. Differences between a cyclone recirculator 500 and an electrostatic precipitator are disclosed in, e.g., WO 2008/147233 A2.

The filter 550, which may be an underflow filter, can communicate with the external third stage separator 400. Generally, a line 570 contains a stream including particulates, and a line 560 contains an extra gas stream 560 containing one or more gases. Typically, the extra gas stream 560 has sufficiently low levels of particulates less than about 10 mg/Nm$^3$, preferably less than about 5 mg/Nm$^3$ and can be sent to a waste gas recovery system and a stack.

The FCC unit 100 can include one or more venturi constrictions 310, 450, and 540. The first venturi constriction 310 can recirculate the dispersion in the line 520. Particularly, the venturi constriction 310 may act as an ejector utilizing fluid in the line 300 as a motive fluid. The second venturi constriction 450 and an optional venturi constriction 540 can be used to control the mass flow rates from respectively, the external third stage separator 400 and the cyclone recirculator 500. Usually, the venturi constrictions 450 and 540 regulate the mass flow, respectively, in the lines 440 and 530 to about 3-about 5%, by mass, of the total outflows from, respectively, the external third stage separator 400 and the cyclone recirculator 500. Generally, the flows in the lines 440 and 530 are minimized yet sufficient to allow particles to flow. Alternatively, one or more process flow control valves can be used for the venturi constrictions 450 and/or 540.

In operation, generally the reactor vessel 120 can receive a hydrocarbon feed 110 containing one or more hydrocarbons in the riser 130. A fluidizing gas 114 can be provided at the bottom of the riser 130 to drive catalyst from the regenerated catalyst standpipe 190 up the riser 130. The one or more hydrocarbons and the catalyst can intermix with the hydrocarbons reacting within the riser 130. Generally, the reaction products can separate from the catalyst at the exit of the riser 130 in the reactor vessel 120. Usually, the catalyst falls toward the stripping zone 150 while the reaction products entrained with the catalysts can enter the reactor cyclone 140. Generally, the reaction products can enter the plenum 160 and exit as one or more cracked, light hydrocarbons in a stream 170.

The catalyst in the stripping zone 150 can pass through the spent catalyst standpipe 180 to the regenerator 200. A combusting gas, typically air, can be provided to an air distributor 250 to combust the coke on the catalyst. Optionally, fresh catalyst can be provided via a line 260 to the regenerator 200. The gases and catalyst can rise where the regenerated catalyst can fall and be provided to the regenerated catalyst standpipe 190. The combustion gases intertwined with particles can enter the first cyclone stage 210. Part of the catalyst can drop to the regenerated catalyst standpipe 190 while gases can pass through a conduit 214 to the second cyclone stage 220. Again, the regenerated catalyst can pass through and fall toward the base of the regenerator 200 while gases can rise through the outlet 230, typically a tube, to the internal plenum 240. Although a large portion of the catalyst and other particles have been separated from the flue gases in the regenerator 200, some particles may still remain entrained in the flue gas. Generally, the flue gas with solids can have a concentration ranging from about 80-about 1,000 mg/Nm$^3$, and more specifically about 300-about 500 mg/Nm$^3$. Typically, the particles in the flue gas can have a distribution as depicted in Table 2 below:

TABLE 2

| | Weight Percent, Based on Weight of Particles | |
|---|---|---|
| Size (μm) | General | Exemplary |
| 0-4 | about 1-about 90 | 40 |
| 4-8 | about 1-about 90 | 8 |
| 8-15 | about 1-about 90 | 23 |
| 15-30 | about 1-about 90 | 25 |
| >30 | about 1-about 90 | 4 |

The size distribution can vary greatly depending on the upstream unit configuration, operating conditions, and catalysts or other additives.

A line 300 can communicate or link the regenerator 200 with the external third stage separator 400. In this exemplary embodiment, the flue gas can pass from the regenerator 200 to the external third stage separator 400. The flue gas can enter the external third stage separator 400 at an inlet 414 and pass through the cyclones 420. Larger particulates can be separated from the flue gas and exit as another stream 440 from the external third stage separator 400. A line 430 can communicate the external third stage separator 400 with the cyclone recirculator 500. Generally, this line contains a flue gas having mostly particles of less than about 10 microns in size. The removal rate of particulates from the external third stage separator 400 can be a function of the particle size distribution.

Typically, particulates less than about 10 microns in size are the most difficult to remove. Usually, all of the particulates of about 10 microns or larger can be removed by the external third stage separator 400 and later captured via the filter 550. The typically smaller particles not separated in the external third stage separator 400 can be sent to the cyclone recirculator 500 for further processing. Generally, the cyclone recirculator 500 can provide a clean gas stream in a line 510 and a further stream in a line 520 that contains particulates. The cleaned gas stream 510 can be sent to the waste gas recovery system to recover the heat prior to exhausting via a stack. Usually, the further stream 520 contains particulates greater than about 10 microns as the smaller particles are agglomerated in the cyclone recirculator 500. The cyclone recirculator 500 can provide the clean gas stream 510 having a particle concentration of no more than about 50 mg/Nm$^3$, preferably no more than about 10 mg/Nm$^3$. The overall gross efficiency can increase from about 60% up to about 95% with the addition of the cyclone recirculator 500 to the FCC unit 100. The further stream 520 can enter the first venturi constriction 310 and then be returned to the external third stage separator 400. Alternatively, an additional stream 530, either instead of or in addition to the further stream 520, can pass through the venturi constriction 540 and then be sent directly to the filter 550. In either instance, another stream 440 from the external third stage separator 400 can pass through the second venturi constriction 450 and/or the additional stream 530 may be provided to the filter 550. Generally, the filter 550 can collect most of the particles entering the external third stage separator 400 by collecting the particles in the line 570 for disposal. The extra gas stream 560 leaving the filter 550 can be sent to the waste gas heat recovery system and a stack.

Figure 2:
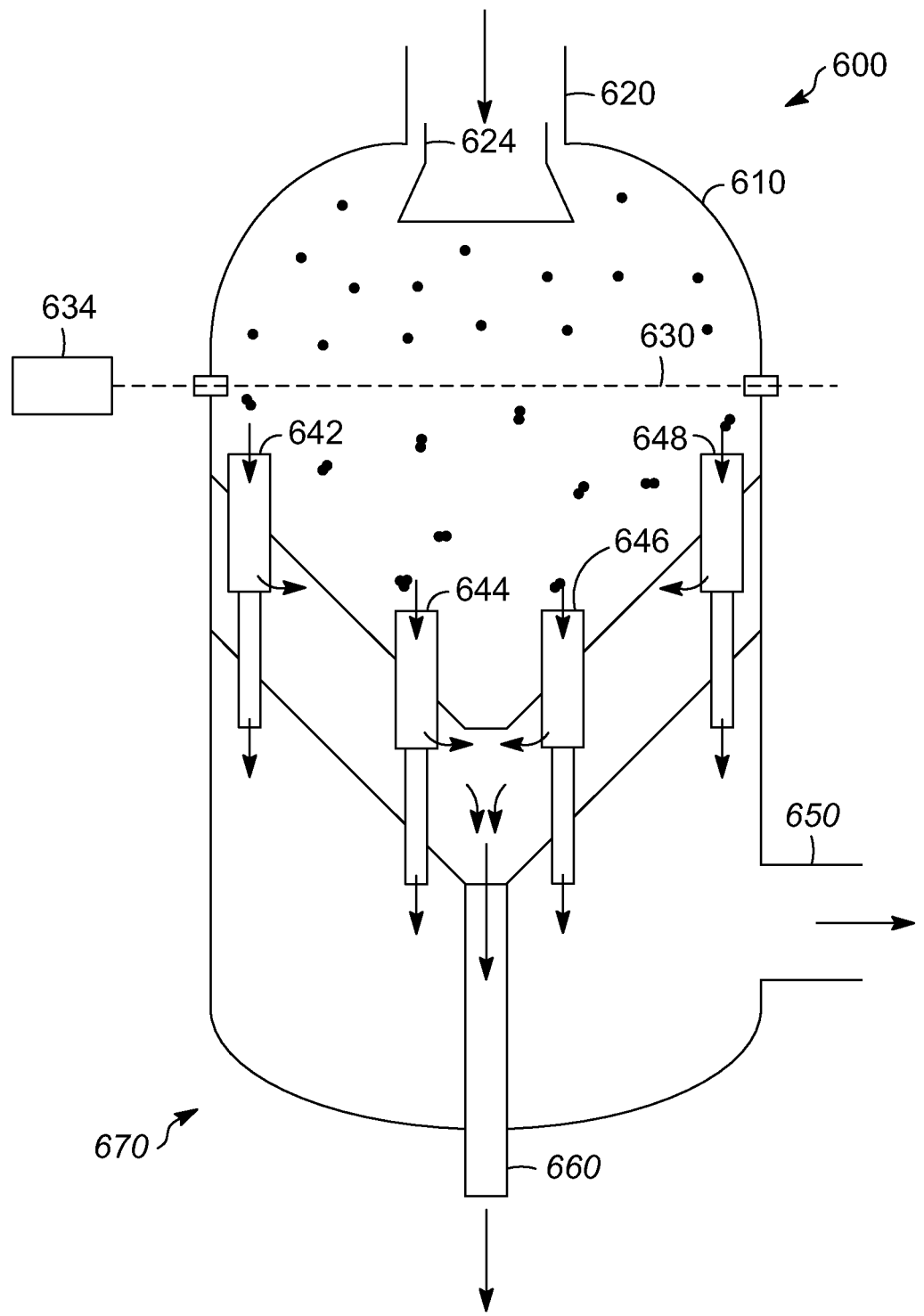
FIG. 2 is a schematic depiction in cross-section of an exemplary external third stage separator with an electrostatic charge field to enhance the collection efficiency.

In another exemplary embodiment, another version of an external third stage separator 600 is depicted in FIG. 2. In this exemplary embodiment, the external third stage separator 600 can replace the external third stage separator 400 and the cyclone recirculator 500 as depicted in FIG. 1.

Generally, the external third stage separator 600 can include a vessel 610, surrounding a distributor 624, and at least one cyclone, typically multiple cyclones 642, 644, 646, and 648. In this exemplary embodiment, the orientation is substantially vertical 670, and the gas stream 300 from the regenerator 200 can be provided directly to an inlet 620 of the external third stage separator 600. The gas can be distributed throughout the vessel 610 via the distributor 624. An electrical current source 634 providing, e.g., a direct current, can communicate with one or more wires 630 to provide an electrical field within the vessel 610. The electrical field can include a series of wires spanning across the vessel 610 with an electrical current flowing through the wires. The electrical current can create a field that charges the particles causing them to agglomerate. Any suitable current density can be utilized for agglomerating the particulate solids.

The increasing particle size can improve the collection efficiency of the external third stage separator 600. Such electrical fields can be provided upstream of the cyclones as described in, e.g., U.S. Pat. No. 4,718,923. The agglomerated particles can enter the cyclones 642, 644, 646, and 648 and be collected into the second outlet 660. From the second outlet 660, the collected particles can be provided to the filter 550 as depicted in FIG. 1. The first outlet 650 can provide a clean gas stream that can be substantially free of particles, particularly those less than about 10 microns. The clean gas stream can be provided to a waste heat recovery system and then to a stack.

ILLUSTRATIVE EMBODIMENT

The following example is intended to further illustrate the subject embodiments. This illustration of an embodiment of the invention is not meant to limit the claims of this invention to the particular details of this example. This example is based on engineering calculations and actual operating experience with similar processes.

Referring to FIG. 1, if the gas stream 300 has a particulate loading of 400 mg/Nm$^3$ and the exemplary particle size distribution as shown in Table 2 at page 6, the clean gas stream 510 concentration from the cyclone recirculator 500 can have particulates as low as 20 mg/Nm$^3$, whereas it could be as high as 160 mg/Nm$^3$ in the stream 430 solely processed with the external third stage separator 400. Some stack regulations require less than 50 mg/Nm$^3$ for environmental purposes.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for separating particulate solids from a gas stream, comprising:
   A) regenerating a catalyst in a regenerator;
   B) separating particulate solids in first and second cyclone stages;
   C) passing the gas stream from the second cyclone stage to an external third stage separator; and
   D) passing the gas stream from the external third stage separator to a cyclone recirculator to obtain a clean gas stream.

2. The process according to claim 1, further comprising passing a further stream from the cyclone recirculator to the external third stage separator.

3. The process according to claim 1, further comprising sending another stream from the external third stage separator to a filter.

4. The process according to claim 3, further comprising passing an extra gas stream from the filter to a waste heat recovery system and then a stack.

5. The process according to claim 4, further comprising passing particulate solids from the filter for disposal.

6. The process according to claim 1, further comprising passing an additional stream from the cyclone recirculator to a filter.

7. The process according to claim 2, further comprising passing the further stream from the cyclone recirculator through a venturi constriction prior to entering the external third stage separator.

8. The process according to claim 6, further comprising passing the additional stream from the cyclone recirculator through a venturi constriction prior to entering the filter.

9. The process according to claim 3, further comprising passing the another stream from the external third stage separator through a venturi constriction prior to entering the filter.

10. The process according to claim 1, wherein the cyclone recirculator contains a direct current electrical field.

11. The process according to claim 1, wherein the cyclone recirculator originates a current density below about 0.1 mA/m$^2$ for agglomerating the particulate solids.

12. The process according to claim 1, wherein the first and second cyclone stages are contained within the regenerator.

13. The process according to claim 1, wherein the external third stage separator is external to the regenerator.

14. A process for separating particulate solids from a gas stream, comprising:
  A) regenerating a catalyst in a regenerator;
  B) separating particulate solids in a first and/or second cyclone stage;
  C) passing the gas stream from the first and/or second cyclone stage to an external stage separator; and
  D) passing the gas stream from the external stage separator to a cyclone recirculator originating a current density below about 0.1 mA/m$^2$ to obtain a clean gas stream, and a further gas stream comprising particulate solids, and sending the further gas stream to the external stage separator.

15. The process according to claim 14, further comprising providing another stream from the external stage separator to a filter.

16. The process according to claim 15, further comprising passing the further gas stream from the cyclone recirculator through a first venturi constriction and passing the another stream from the external stage separator through a second venturi constriction.

\* \* \* \* \*